(12) United States Patent
Zientek

(10) Patent No.: US 7,281,900 B2
(45) Date of Patent: Oct. 16, 2007

(54) CASCADE ROTOR BLADE FOR LOW NOISE

(75) Inventor: Thomas A. Zientek, Drexel Hill, PA (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 11/129,594

(22) Filed: May 13, 2005

(65) Prior Publication Data
US 2006/0257261 A1 Nov. 16, 2006

(51) Int. Cl.
F04D 29/32 (2006.01)

(52) U.S. Cl. .................................. 416/231 B

(58) Field of Classification Search ............ 416/1, 416/231 B, 236 R; 415/119; 244/17.23
See application file for complete search history.

(56) References Cited

U.S. PATENT DOCUMENTS

| | | | | |
|---|---|---|---|---|
| 1,553,627 A | * | 9/1925 | Nagler | 416/195 |
| 1,804,434 A | * | 5/1931 | Reed | 416/228 |
| 3,166,129 A | * | 1/1965 | Bryan | 416/24 |
| 4,687,416 A | * | 8/1987 | Spranger | 416/223 A |
| 6,789,764 B2 | * | 9/2004 | Bass et al. | 244/10 |

* cited by examiner

Primary Examiner—Edward K. Look
Assistant Examiner—Devin Hanan
(74) Attorney, Agent, or Firm—Harness, Dickey & Pierce, P.L.C.

(57) ABSTRACT

Low-noise airfoils and methods of reducing noise. One embodiment provides an aerodynamic member that includes two body portions coupled to each other. The second body portion includes a plurality of airfoil members in a fixed relationship with each other. Optionally, the airfoil members may define an open end of the second body portion. In the alternative, the member can include a third body portion that has an airfoil shape and that is coupled to the second body portion opposite the first body portion. Preferably, the first portion, the airfoil members, and third portion are 12%, 8%, and 2% thickness/chord airfoils respectively. Further, the aerodynamic member may be a rotor blade on a tandem helicopter. Another embodiment provides a cambered airfoil with two coupled body portions one of which has air foil members. One of the body portions includes a slot there through with airfoil members on opposite sides of the slot.

8 Claims, 10 Drawing Sheets

CASCADE ROTOR BLADE FOR LOW NOISE

FIELD

This disclosure relates generally to low-noise airfoils and, more particularly, to low-noise rotor blades for helicopters.

BACKGROUND

Helicopters provide a flexible means of transporting supplies, passengers, and cargo over moderate distances at relatively high speeds. Unfortunately, the rotor blades of helicopters can produce a considerable amount of noise. In large part, the noise is "thickness noise" that is created by the blades as they move through the atmosphere. Thickness noise is produced by any body that moves through a fluid and that (of course) has some finite thickness. At its loudest, the thickness noise of a helicopter rotor blade noise originates near the tip of the advancing blade and is familiar to anyone who has heard the slapping sound of a nearby (or even distant) helicopter.

In large part because of thickness noise, the operation of helicopters is frequently restricted, or curtailed, over areas where people may be present, particularly over residential areas. The noise associated with helicopter landings and takeoffs also restricts the locations where helipads may be positioned. Thus, thickness noise constrains an otherwise versatile form of transportation. Thickness noise also plays the dominant role in the interior noise of tiltrotors when operated in airplane mode where the rotor serves as a propeller.

SUMMARY

It is in view of the above problems that the present disclosure was developed. The disclosure provides low-noise airfoils and methods of reducing airfoil thickness noise while maintaining sufficient aerodynamic efficiency. In addition, this disclosure also applies to the propeller blades of tilt rotor vehicles as well as other propeller driven aircraft and other applications wherein a blade passing through a fluid might produce thickness noise.

More particularly, the present disclosure provides embodiments that decrease the thickness noise radiated from helicopter rotor discs. In accordance with the principles of the present disclosure, a helicopter rotor with a small number of blades (less than about four) can have noise characteristics similar to that of a rotor with a large number of blades (more than about nine). According to one embodiment, a tandem helicopter employing 3 blades per rotor is provided that has similar far-field noise characteristics as those of a tandem helicopter employing 12 (or more) blades per rotor.

A first embodiment of the present disclosure provides an aerodynamic member that includes two body portions coupled to each other. The first body portion may be a conventional airfoil while the second body portion includes a plurality of airfoil members held in a staggered relationship with each other by the first body portion. Optionally, the airfoil members may define an open end of the second body portion. In the alternative, the member can include a third body portion that has an airfoil shape and that is coupled to the second body portion opposite the first body portion. Preferably, the first portion, the airfoil members of the second body portion, and third body portion are, respectively, 12%, 8%, and 2% thickness/chord airfoils with the third body portion preferably being a supercritical airfoil. Further, the aerodynamic member may be a rotor blade on a tandem helicopter with the body portions all having a common overall thickness.

A second embodiment provides a helicopter with an airframe, an engine, a transmission, and at least one (and preferably three) rotor blades. Of course, the engine and the transmission are operatively coupled to drive the blade. The blade includes two body portions coupled to each other with thicknesses that may be equal. The second body portion (preferably the outboard portion of the blade) includes a plurality of airfoil members in a staggered relationship with each other. Further, the helicopter can be a tandem helicopter with two sets of overlapping rotor blades and four airfoil members in the second body portions of each blade.

Another embodiment provides a method of controlling noise produced by an aerodynamic member as the aerodynamic member passes through an atmosphere and, preferably, at a subsonic speed. Again, the second body portion includes a plurality of airfoil members in a staggered relationship with each other. Of course, the aerodynamic member can be stationary and the atmosphere, or fluid, can flow around the aerodynamic member instead. Additionally, the method may include lifting a helicopter that has overlapping rotor discs with the member.

Further features and advantages of the present disclosure, as well as the structure and operation of various embodiments of the present disclosure, are described in detail below with reference to the accompanying drawings.

BRIEF DESCRIPTION OF THE DRAWINGS

The accompanying drawings, which are incorporated in and form a part of the specification, illustrate exemplary embodiments of the present disclosure and together with the description, serve to explain the principles of the disclosure. In the drawings.

DETAILED DESCRIPTION

The far field noise of a helicopter is influenced primarily by the noise generated by the rotor blades. This noise propagates out from the helicopter generally in the plane of the rotor disc and is mostly thickness, noise. Generally, thickness noise is associated with the passage of an object through the air regardless of whether the object generates any lift, drag, control, or other aerodynamic forces. This thickness noise is directly proportional to the thickness of the blade and to the speed of the rotor. Traditional means of reducing thickness noise include 1) lowering the rotor speed, 2) using blades with thinner cross sections, or 3) using more blades of equal thickness ratios Each of these approaches has drawbacks. Lowering the rotor speed significantly impacts the loads on the drive system. More particularly, lowering the rotor speed increases the torque required to lift a given load. Thus, lowering the design speed of the rotor increases the design load for each component within the drive system. These higher design loads result in a heavier drive system and therefore, less payload, for a given amount of power. Thinning the blade sections, especially thinning the sections to thickness-to-chord ratios of less than 2%, might adversely impact the maximum lift characteristics of the airfoil. As a result, the blade might lose useful lift. Because of the drawbacks of the first two approaches, a third alternative (adding blades while maintaining the same blade area or solidity) is often used to reduce noise. However, constraints on the design of the rotor hub (for example the increased hub envelope required for additional bearings, pitch links, etc. for the additional blades) can prove difficult, if not prohibitive, to provide where this approach is attempted. Adding blades also necessarily leads to a more complicated rotor hub that decreases both the maintainability and reliability of the helicopter.

For tandem rotor helicopters, the overlap of the two rotor disks further constrains the ability of a designer to add blades to the rotor disc. As the number of blades increases, the overlap must decrease (e.g. a three-bladed tandem can tolerate overlaps as great as 34% while a four-bladed tandem can only tolerate overlaps as large as 30%). Thus, for a rotor design with a relatively large number of blades (greater than about ten) very little overlap is possible. Furthermore, as the overlap decreases, the rotor disc loading increases for a given fuselage length with a corresponding increase in the hover power requirements for the helicopter. Thus, the traditional means of reducing rotor noise are accompanied by serious constraints and disadvantages. In contrast, the present disclosure provides improved low-noise airfoils and methods of reducing the thickness noise associated with airfoils.

Figure 1:
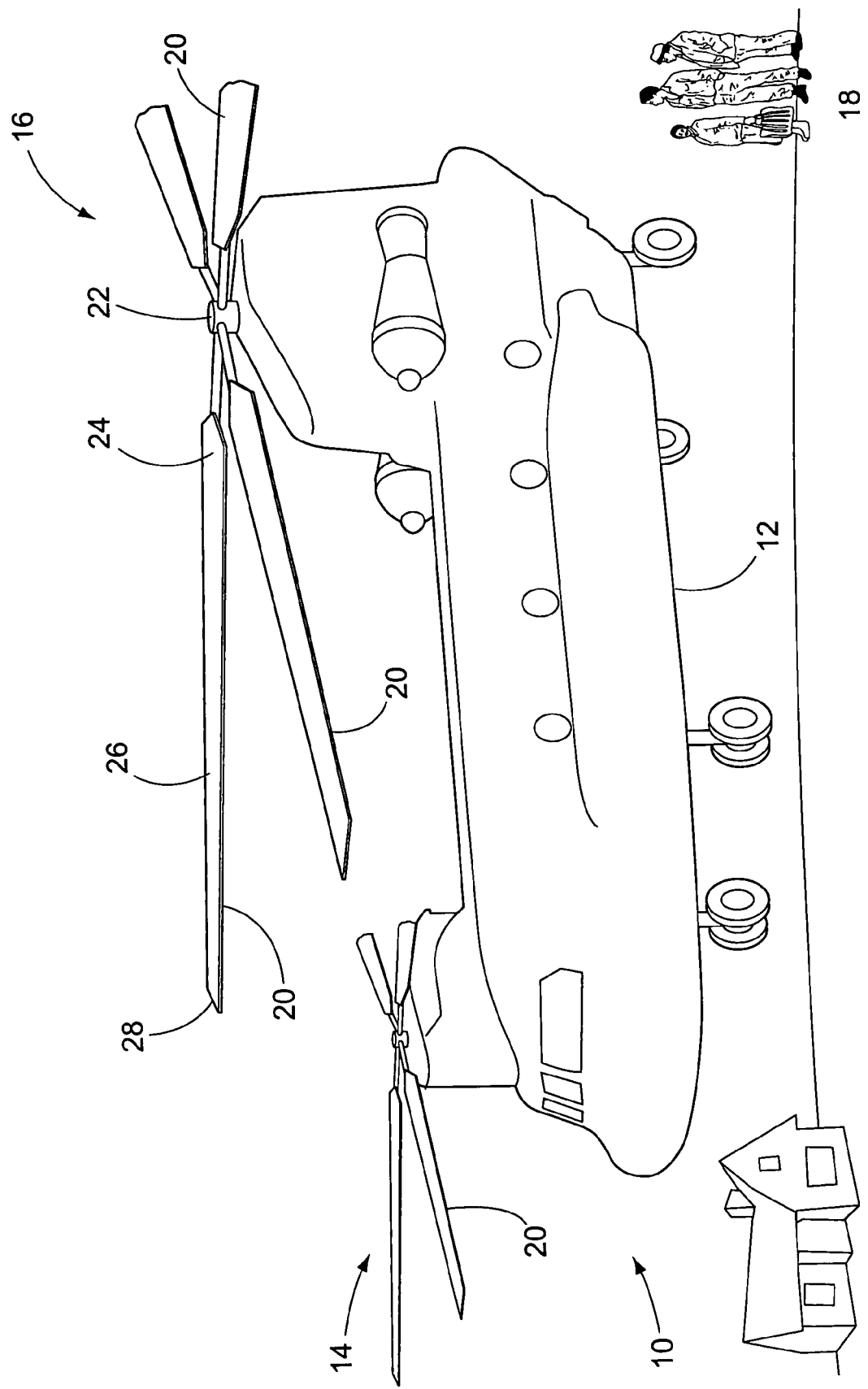
FIG. 1 illustrates a helicopter constructed in accordance with the principles of the present disclosure.
Figure 2:
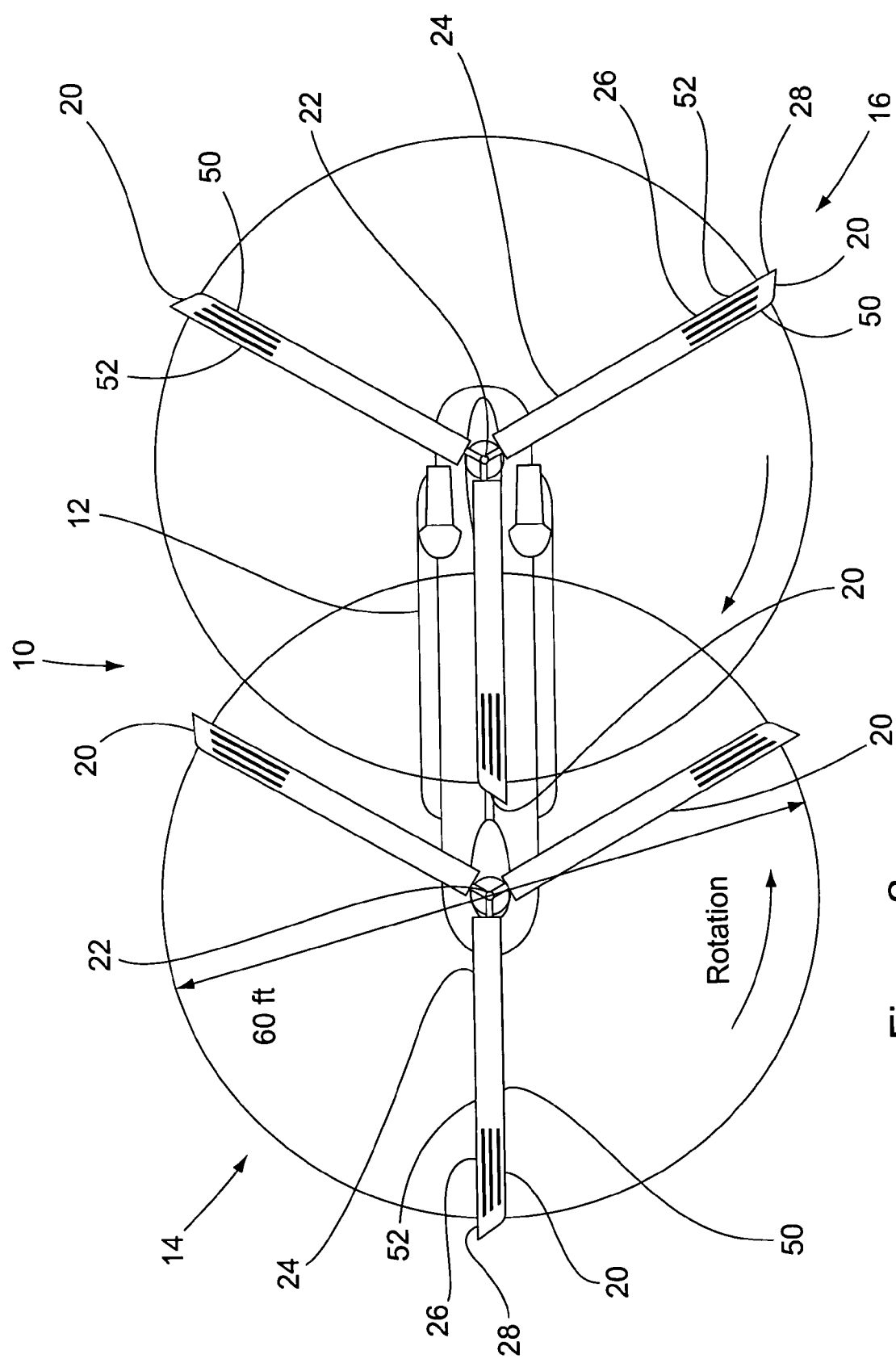
FIG. 2 illustrates a top plan view of the helicopter of FIG. 1.

Referring to the accompanying drawings in which like reference numbers indicate like elements, FIG. 1 illustrates a helicopter constructed in accordance with the principles of the present disclosure. The helicopter 10 includes an airframe 12, a forward rotor 14, and an aft rotor 16. Also shown, in the background, are residential areas 18 and other locations where it is desirable to limit the noise associated with the helicopter 10. Each of the rotors 14 and 16 includes a plurality of blades 20 and a rotor hub 22. Of course, the fuselage 12 contains an engine, a transmission, and provisions for carrying cargo, passengers, and other objects while in flight. The engine is coupled to and drives the transmission. In turn, the transmission drives the rotor hub 22 which is coupled to the blades 20. Each of the blades 20 includes an inboard portion 24, an intermediate portion 26, and an outboard (or tip) portion 28. FIG. 2 shows that the circular areas of rotation for the two rotors 14 and 16 may overlap if the rotors 14 and 16 are synchronized via, for example, being driven by a common transmission. By causing the blades 20 to rotate through the atmosphere lift is produced and the helicopter 10 is enabled to fly. While FIGS. 1 and 2 show a CH-47 Chinook helicopter (available from The Boeing Company of Chicago, Ill.) with the blades 20, the disclosure applies to any airfoil not just the rotor blades 20.

Figure 3A:
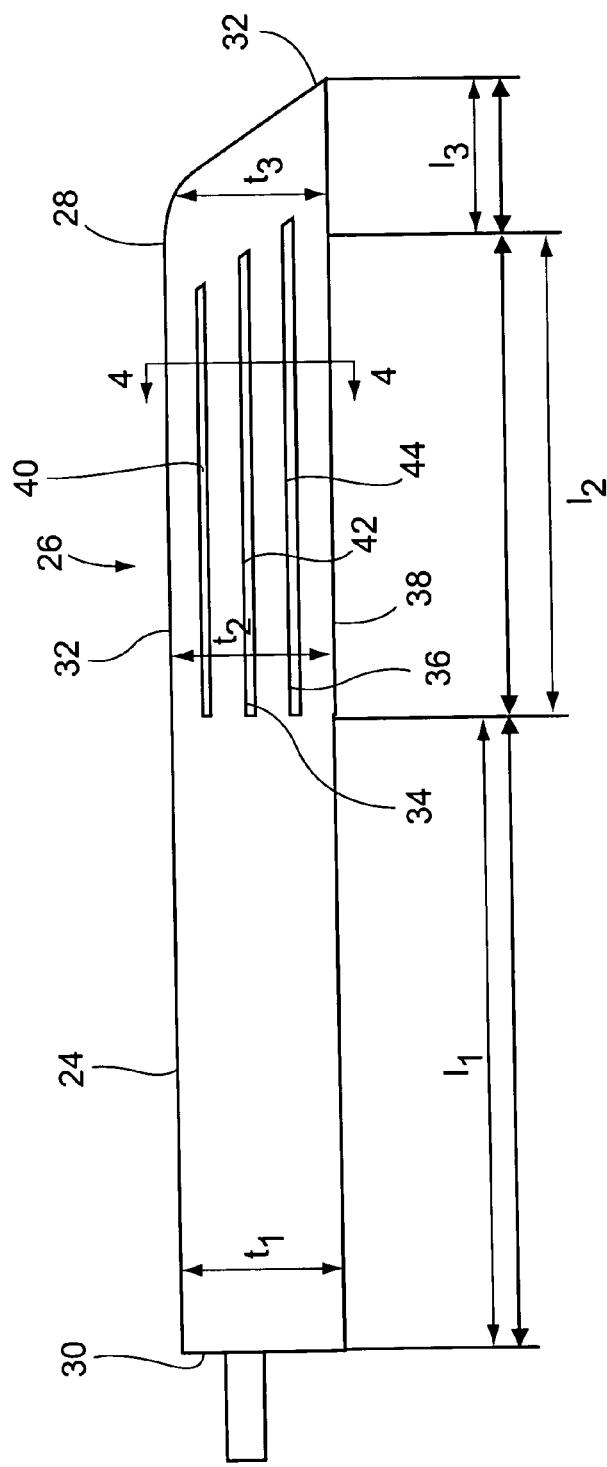
FIG. 3 illustrates a front plan view of a rotor blade of the helicopter shown in FIG. 1.

With reference now to FIG. 3A, a front elevation view of one of the blades 20 is illustrated. As shown in FIG. 3, the portions 24, 26, and 28 each have an overall thickness "t1," "t2," and "t3," respectively, that may be about equal. FIG. 3 also shows that the inboard portion 24 extends from the inboard end 30 of the blade 20 a length "$l_1$" to a location at which it may be desirable to reduce the thickness noise associated with the outer sections of the blade 20. Preferably, the inboard portion 24 (that is subject to lower linear velocities than the other outer portions 26 and 28) is an airfoil with a thickness to chord ratio selected to optimize the lift and drag characteristics of this portion 24 of the blade 20 when considered along with the lift and drag characteristics of the overall blade 20. In one embodiment, the inboard portion 24 has a thickness-to-chord ratio (hereinafter "t/c") of about 12%. Turning next to the outboard portion 28, this blade portion 28 may be subject to occasional transonic speeds because of the rotation of the rotor. Accordingly, in one embodiment, the outboard portion 28 is a supercritical airfoil with a "t/c" of about 2%. Preferably, the outboard portion 28 is constructed in such a fashion as to stiffen the cascade elements of the intermediate portion 26 and hold them in fixed relationship to each other and the overall blade 20.

Figure 3B:
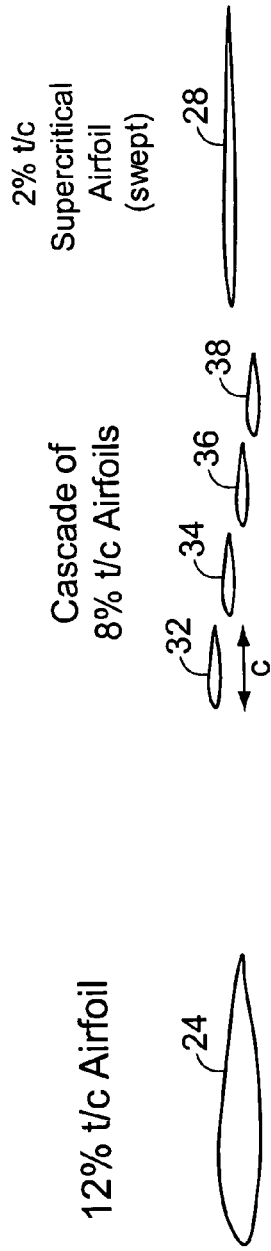

FIGS. 3A and 3B also show that the intermediate portion 26 preferably extends a length "$l_2$" from the inboard portion 24 to a location where occasional transonic speeds might be encountered by the blade 20. The intermediate blade portion 26 includes a plurality of airfoil members 32, 34, 36, and 38 that define, and are separated by, a plurality of slots 40, 42, and 44. Each of the airfoil members 32, 34, 36, and 38 may be formed integrally with the inboard portion 24 and the outboard portion 28 of the blade. If the airfoil members 32, 34, 36, and 38 are formed as a portion 26 of a single, unitary blade then larger assemblies that incorporate the blade 20 (e.g., a helicopter) will have the same number of parts as similar assemblies having conventional blades while also producing less rotor noise. In other embodiments, each of the airfoil members 32, 34, 36, and 38 has a chord "c" that is a fraction of the chord of the corresponding conventional blade portion that the members replace. These airfoil members are preferably airfoils having a "t/c" of about 8%, although the shape of any airfoil member 32, 34, 36, and 38 may be different than the shape of the other airfoil members.

Figure 4A:
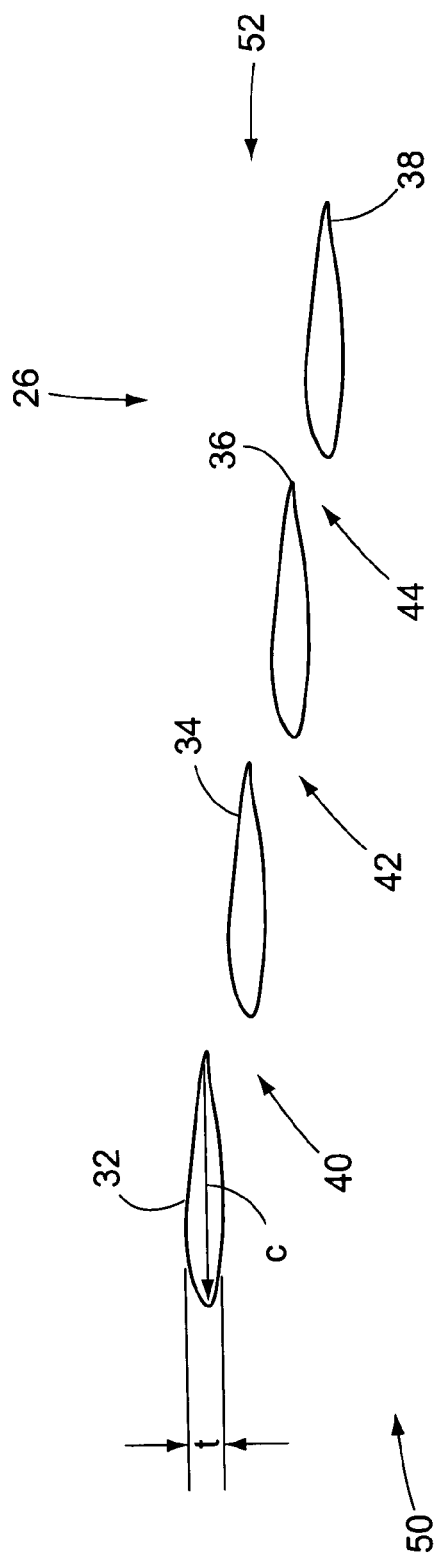
FIGS. 4A and 4B illustrate alternative cross sections of the rotor blade as viewed along line 4-4 in FIG. 3.
Figure 4B:
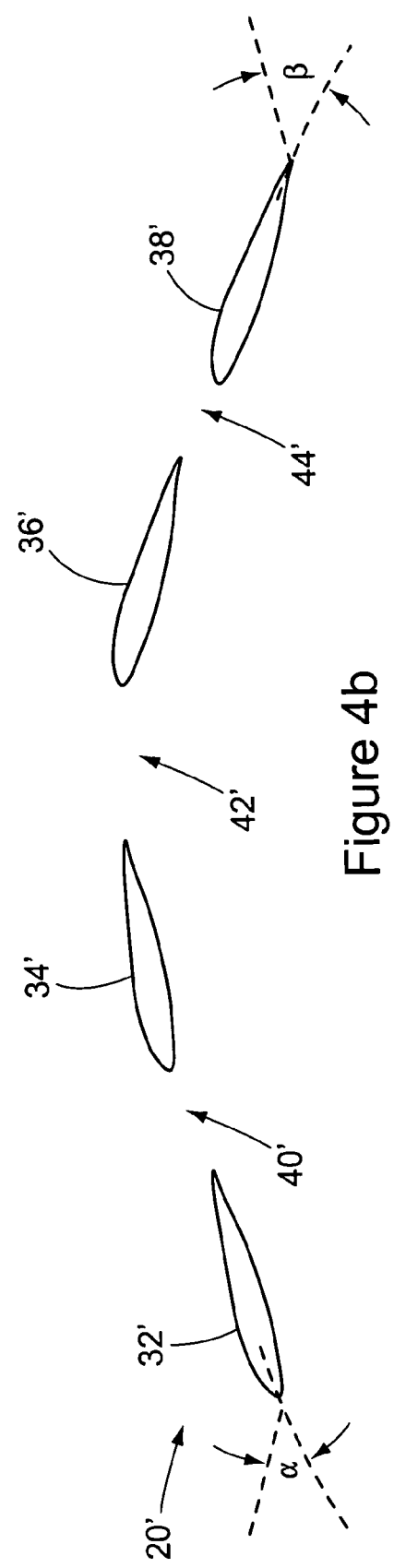

In FIG. 2, the outboard portion 28 is shown as extending a distance "$l_3$" from the inboard portion 24 to the tip (or outboard end or distal end 46) of the blade 20. In the alternative, the outboard portion 28 may be omitted entirely thereby leaving the airfoil members 32, 34, 36, and 38 to define an open tip of the intermediate portion 26 (i.e. the blade 20). FIG. 4A shows one of the many possible cross sections of the intermediate portion 26. As shown, the airfoil members 32, 34, 36, and 38 are preferably arranged in a tandem manner along the chord of the overall blade 20. For instance, the airfoil members 32, 34, 36, and 38 can be staggered in a diagonal manner between the leading edge and trailing edge of the blade 20. The airfoil members 32, 34, 36, and 38 may also be arranged with the topmost member 32 leading the other members 34, 36, and 38. FIG. 4B shows another of the many possible cross sections of the intermediate portion 26 in which the airfoil members 32', 34', 36', and 38' are arranged to form a "cambered" wing 20'. As is known, positive camber of a conventional airfoil means that the leading edge is lower than the top surface of the midsection of the airfoil. That is, when viewed from the side, the airfoil has curvature associated with a line connecting all of the midpoints of the airfoil. In many applications, cambered wings are preferred because they exhibit lift even though their physical incidence is zero and, therefore, the zero lift intercept of the cambered wing's lift curve is shifted toward negative incidences. As applied to the cascade wing of the current embodiment, the term "cambered" means that the leading airfoil member 32' has a nose-down incidence α and the trailing airfoil member 38' will have a nose-up incidence β with respect to the middle airfoil members 34' and 36'. These middle airfoil members 36' and 38' have intermediate incidences that can be selected according to the particular application of the cambered wing 20'. Of course, the incidences (for example α and β) of each particular airfoil member 32', 34', 36', and 38' can be chosen to tailor the speed and direction of airflow through the slots 40', 42', and 44' to thereby optimize the lift/drag characteristics of the intermediate portion 26.

In operation, air passes around the surfaces of the inboard portion 24 and the outboard portion 28 with these portions 24 and 28 holding the airfoil members 32, 34, 36, and 38 of the intermediate section 26 in a fixed relationship to one and other. Thus, as the rotor 14 or 16 rotates, some air passes around each of the airfoil members 32, 34, 36, and 38 and through the slots 40, 42, and 44. Preferably, the number and aerodynamic characteristics of the airfoil members 32, 34, 36, and 38 are chosen so that the intermediate portion 26 produces the same lift as a corresponding portion of a conventional blade. However, because each of the members 32, 34, 36, and 38 is thinner than the corresponding conventional blade portion the members 32, 34, 36, and 38 each (and collectively) produces less thickness noise than the corresponding conventional blade portion.

Figure 5:
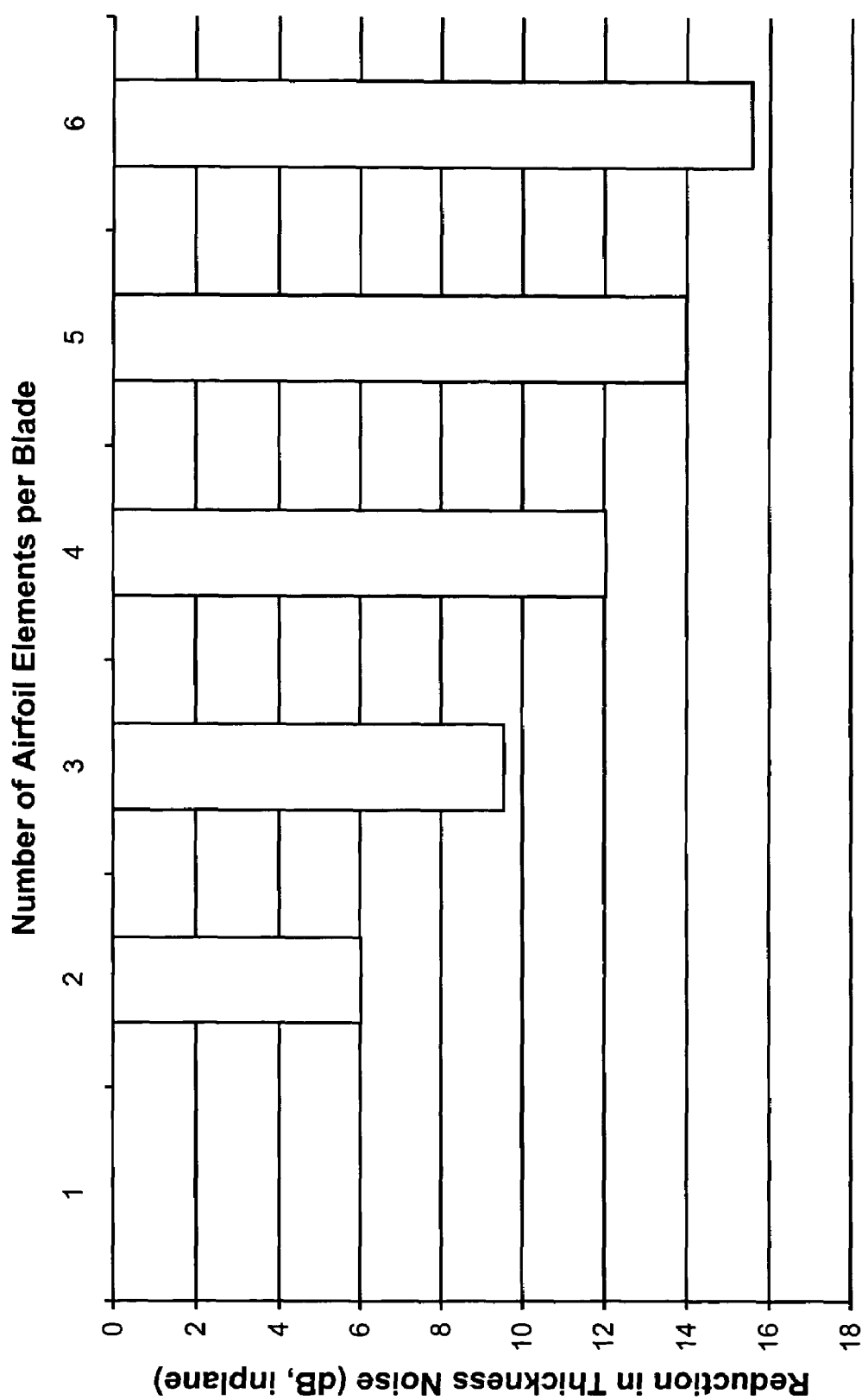
FIG. 5 illustrates a graph of the noise reduction associated with the rotor blade of FIG. 2.

FIG. 5 shows the results of a preliminary analysis of the noise reduction that can be provided in accordance with the principles of the present disclosure. For an intermediate portion 26 that includes two airfoil members 32 and 34, FIG. 5 shows that the in-plane thickness noise is reduced by about 6 decibels. For an intermediate portion 26 that has six airfoil members, FIG. 5 shows that the noise reduction would be about 16 decibels. As FIG. 5 illustrates, the estimated noise reduction is dependent on the number of airfoils. Thus, by choosing the number and aerodynamic characteristics of the airfoil members it is possible to significantly reduce the thickness noise associated with any airfoil and, more particularly, helicopter rotor blades.

Figure 6:
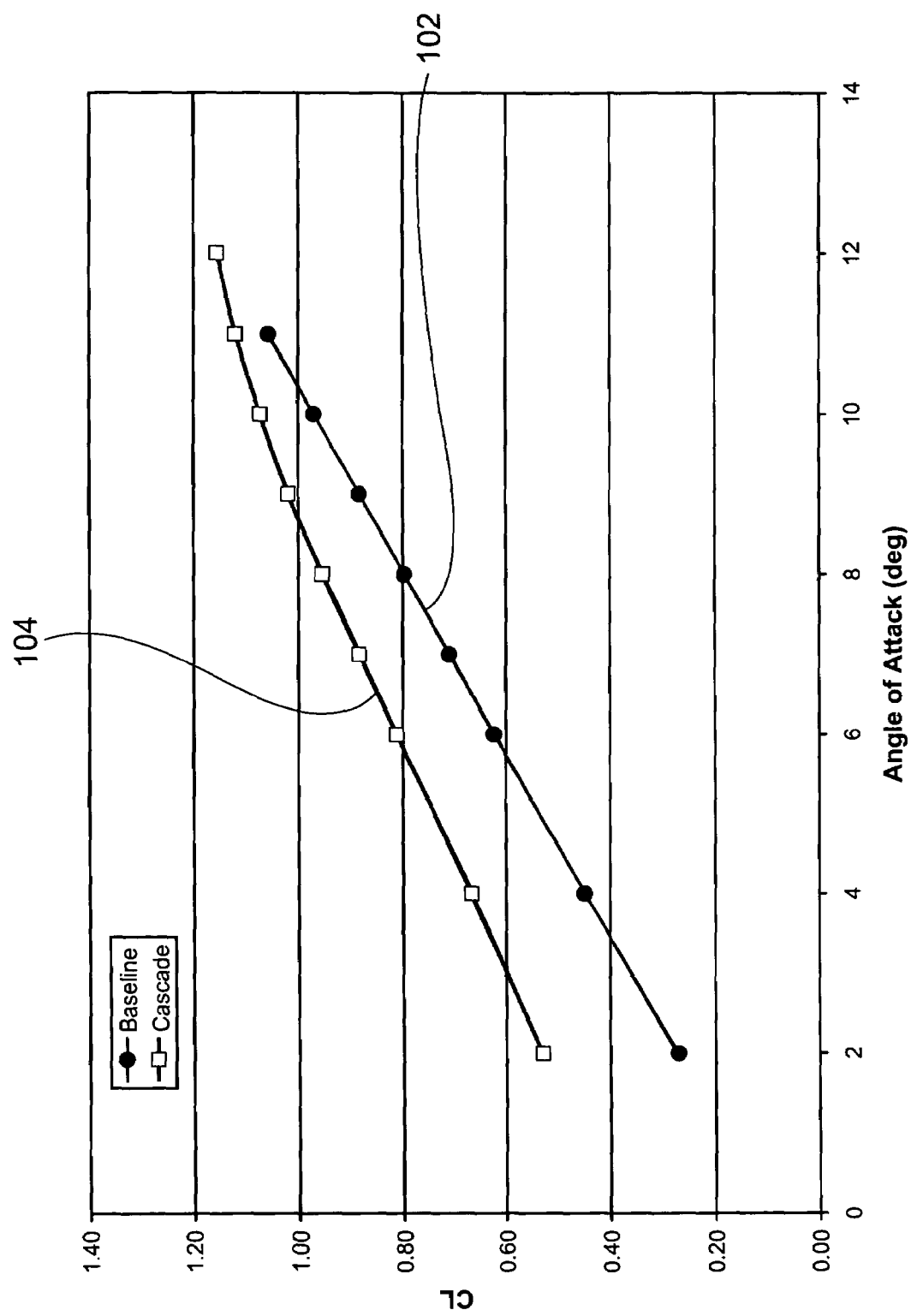
FIG. 6 illustrates a graph of a comparison of the coefficient of lift of a nonrotating equivalent of the cascade elements of the blade of FIG. 3 and a conventional reference blade section.
Figure 7:
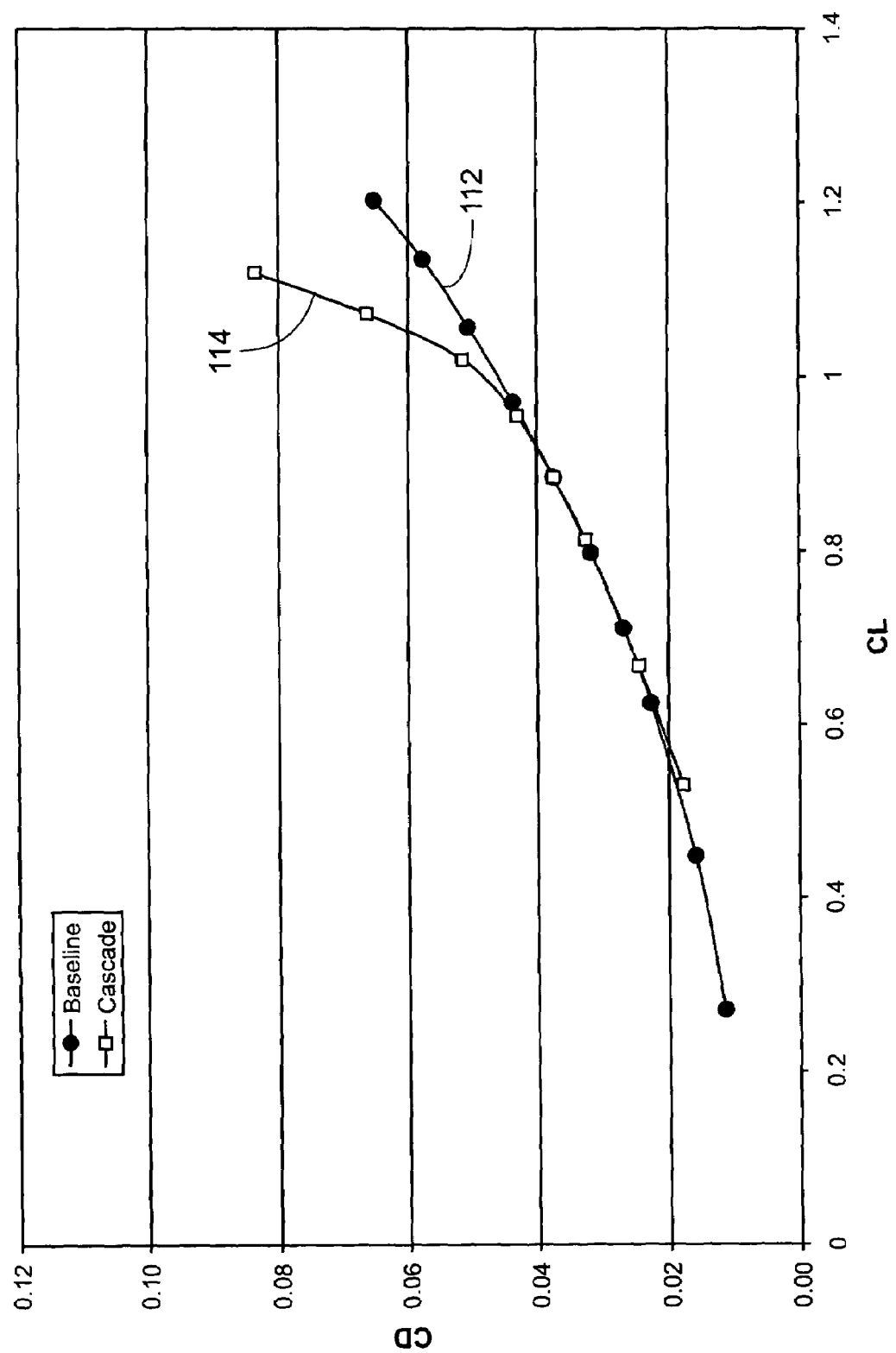
FIG. 7 illustrates a drag polar comparison of a nonrotating equivalent of the cascade elements of the blade of FIG. 3 and a conventional reference blade section.

FIGS. 6 and 7 further show that blades, and other airfoils, constructed in accordance with the principles of the present disclosure will provide performance similar to conventional airfoils while reducing noise. The figures show the results of a preliminary assessment of two fixed wings of equal area and aspect ratio. One of the wings is a conventional wing whereas the other wing 20' employs four airfoil members 32', 34', 36', and 38', arranged in a cascade, or tandem, manner as illustrated in FIG. 4B. FIG. 6 shows the lift characteristics of the two wings with curve 102 representing the performance of the conventional wing and curve 104 representing the performance of the cascade wing 20' of the current embodiment. FIG. 7 shows the drag polars of the two wings with the curve 112 representing the conventional wing and the curve 114 representing the cascade wing 20'. As shown in FIG. 6, the cascade wing 20' of the current embodiment performs more efficiently when the airfoil members 32', 34', 36', and 38' collectively form a "cambered" lifting surface. FIGS. 6 and 7 also show that the drag of the cascade wing is nearly identical to the conventional wing as long as the airfoil members of the cascade wing remain un-stalled. Thus, FIG. 7 shows that there will be very little, if any, performance penalties associated with replacing a conventional airfoil with a cascade airfoil of the present invention except for Reynolds number effects. Thus, in a preferred embodiment a helicopter 10 (see FIG. 1) is retrofitted with cascade blades 20'.

Figure 8:
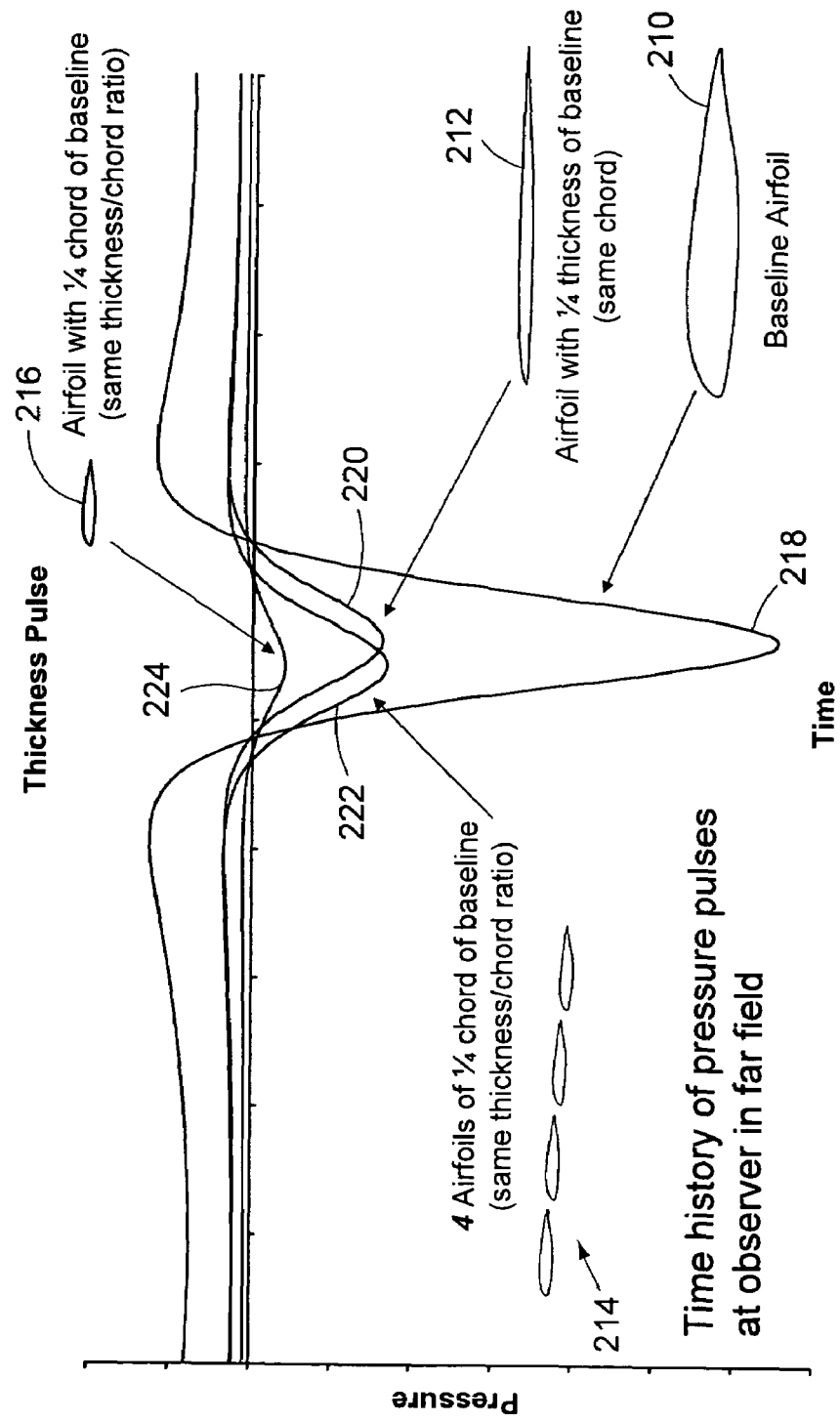
FIG. 8 illustrates the noise reduction associated with the cascade elements of the blade of FIG. 3.

Turning now to FIG. 8, the noise reduction provided by one preferred embodiment of the present disclosure is illustrated. More particularly, FIG. 8 illustrates four different blades or blade sections 210, 212, 214, and 216 and the pressure pulses 218, 220, 222, and 224 associated with the passage of the blade sections through a fluid (e.g., air). The blade 210 is a conventional airfoil with a typical thickness and chord. Similarly, the blade 212 is also a conventional blade that has been thinned to a thickness of about one fourth the thickness of the blade 210. In contrast, the blade section 214 is constructed in accordance with the principles of the present disclosure. The exemplary blade section 214 illustrated in FIG. 8 has four cascade elements each having a chord one fourth that of the conventional blade 210. The cascade elements of the blade section 214 have the same overall profile and thickness to chord ratio as the conventional blade 210. For reference, FIG. 8 also shows an individual cascade element 216.

Of course, the sound associated with each of the blades 210, 212, 214, and 216 is proportional to the corresponding pressure pulse 218, 220, 222, and 224 produced when the blades (sections) move through the air. As shown in FIG. 8, the conventional blade 218 produces the large pressure pulse 218. The other conventional blade 212, which is less thick than blade 210, produces a correspondingly less intense pressure pulse 220. The least intense of the illustrated pressure pulses, pressure pulse 224, arises from the passage of the single cascade element 216 through the air. The remaining pressure pulse 222 is produced by the blade section 214 with its four cascade elements 216.

By comparing the pulses 218, 220, 222, and 224 it is therefore possible to judge the relative amount of sound created by each of the blades 210 and 212 and blade sections 214 and 218. For instance, the pulse 218 created by the thicker conventional blade 210 is about four times more intense than the pulse 220 or 222 created by the blade 212 and blade section 214 respectively. Thus, the sound produced by either the conventional (but thin) blade 212 and the blade section 214 (which is constructed in accordance with the principles of the present invention) is about one fourth as intense as the sound produced by the conventional blade 210. However, because the blade section 214 produces more lift than the thin conventional blade 212 (see FIG. 6), the present disclosure allows blades to be constructed that produce more lift while also dramatically decreasing the associated thickness noise.

Figure 9:
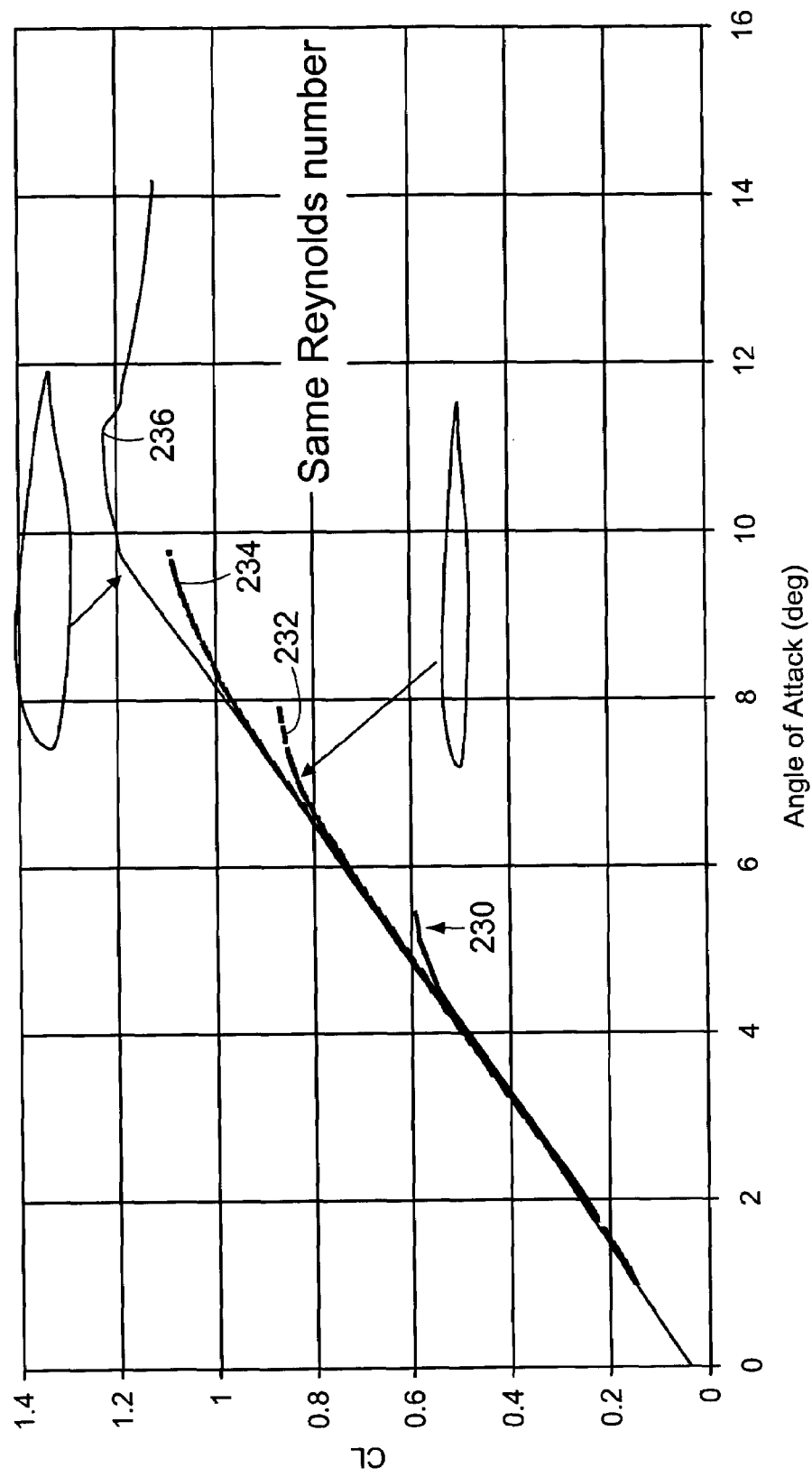
FIG. 9 illustrates the effect that varying the thickness of a cascade element has on the element's coefficient of lift.

FIG. 9 illustrates the one of the effects of thinning conventional blades to reduce thickness sound. More particularly, FIG. 9 illustrates that the coefficient of lift plots 230, 232, 234, and 236 for four different blades that have the same shape and chord length but thicknesses of 2%, 4%, 6%, and 8% respectively. Noticeable decreases in the maximum lift occur at angles of attack as low as about 4.5 degrees (see reference 230) depending on the amount by which the blade is thinned. Thus, simply thinning a blade results in a significant decrease in maximum lift as shown by FIG. 9.

Figure 10:
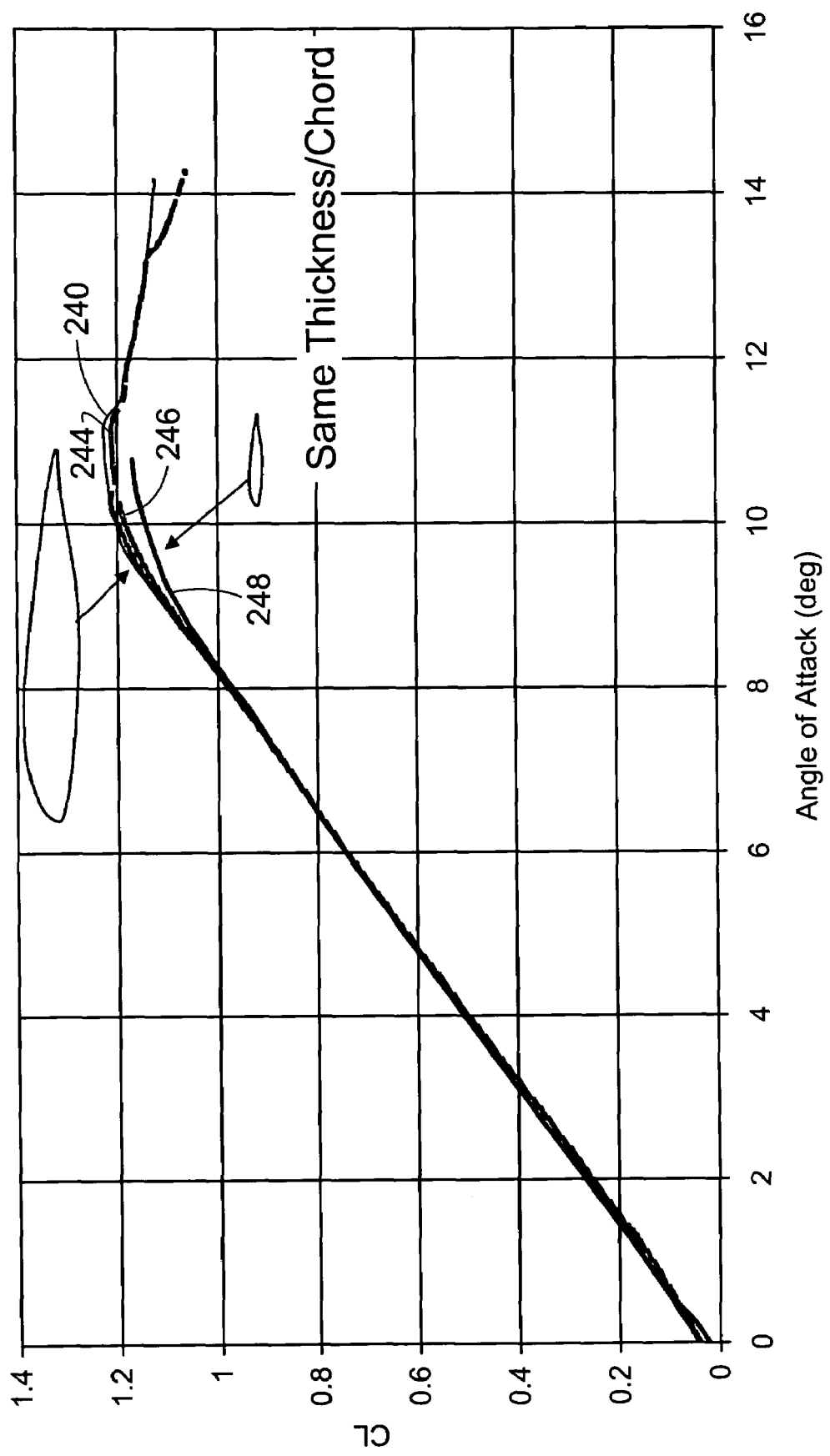
FIG. 10 illustrates the effect that varying the Reynolds Number has on the coefficient of lift of a typical cascade element.

In contrast to the thinned blades illustrated by FIG. 9, FIG. 10 shows the effects of reducing the overall size of the cascade elements of a blade section that is constructed in accordance with the principles of the present disclosure. The coefficient of lift (versus angle of attack) plots 240, 242, 244, and 246 correspond to a blade and to three cascade elements that are about 75%, 50%, and 25% the size of the blade. Of course, the blade and the three cascade elements have the same overall profile and thickness to chord ratio of about 8%. The coefficient of lift for the blade and the coefficient of lift for each size of the cascade elements are illustrated respectively by the plots 240, 242, 246, and 248. As shown, the coefficients of lift for the cascade elements (see plots 242, 244, and 248) are predicted to be similar to the coefficient of lift for the blade (plot 240) across most angles of attack. Only at relatively high angles of attack do the smaller cascade elements (plots 242, 244, and 246) begin to loose lift compared to the blade (plot 240). Thus, the blade may be replaced with the set of cascade elements without affecting the operational envelope of the vehicle (or other apparatus) that employs the blade. Of course, the overall profile and thickness to chord ratio of the cascade elements may vary from the shape and thickness to chord ratio of the blade and even each other.

Reducing the size of the cascade elements also reduces the Reynolds number associated with the air flowing around the cascade elements and therefore, potentially, could reduce the coefficient of lift for the cascade elements. The cascade elements that were discussed with reference to FIG. 10 each had a thickness that was about 8% of the cascade element's chord length. Otherwise the cascade elements were similar to the 8% blade illustrated by lift coefficient plot 236 of FIG. 9. At an airspeed of about Mach 0.4, the Reynolds numbers were respectively $7.6*10^6$ (for the blade), $5.7*10^6$ (for the 75% cascade element), $3.8*10^6$ (for the 50% cascade element), and $1.9*10^6$ (for the 25% cascade element). Thus, the Reynolds number associated with the 25% cascade element is sufficiently high to avoid adverse affects to the element's coefficient of lift. Accordingly, a blade section with cascade elements can be designed to match the maximum lift characteristics of a full size, conventional blade despite the lower operational Reynolds number of each cascade element as long as each element is designed to stall at a similar angle of attack which was shown to be possible in FIGS. 6 and 7.

In view of the foregoing, it will be seen that the several advantages of the disclosure are achieved and attained. Helicopters have been provided that generate less thickness noise with the same number of blades while avoiding the weight and power penalties associated with other noise reduction approaches. Also, while producing less noise than other helicopters, the helicopters provided by the present disclosure have the same number of components thereby minimizing (if not, eliminating) design impacts on other components of the helicopter such as the rotor hub, transmission, or engine. Furthermore, airfoils with improved thickness noise characteristics have been provided that perform (in terms of lift and drag) in a manner similar to previous airfoils.

The embodiments were chosen and described in order to best explain the principles of the disclosure and its practical application to thereby enable others skilled in the art to best utilize the disclosure in various embodiments and with various modifications as are suited to the particular use contemplated.

As various modifications could be made in the constructions and methods herein described and illustrated without departing from the scope of the disclosure, it is intended that all matter contained in the foregoing description or shown in the accompanying drawings shall be interpreted as illustrative rather than limiting. For example, the blade could include airfoil members that extend nearly the length of the blade with one, or more, airfoil portions (similar to the inboard portion 24) joining the airfoil members and providing structural strength to the blade. Thus, the breadth and scope of the present invention should not be limited by any of the exemplary embodiments, but should be defined in accordance with the claims and their equivalents.

What is claimed is:

1. An aerodynamic member comprising:
    a first body portion having a first overall thickness;
    a second body portion coupled to the first body portion, having a second overall thickness, and including a plurality of airfoil members within the second overall thickness, the airfoil members being in a fixed relationship with each;
    a third body portion including an airfoil and coupled to the second body portion on a side of the second body portion that is opposite the first body portion; and
    wherein the first body portion comprises a 12% thickness/chord airfoil, the airfoil members comprise 8% thickness/chord airfoils, and the third body portion comprises a 2% thickness/chord supercritical airfoil.

2. The member of claim 1, wherein the plurality of airfoil members includes four airfoil members.

3. The member of claim 1, wherein the member is adapted to lift a helicopter.

4. The member of claim 1, wherein the first overall thickness is about equal to the second overall thickness.

5. The member of claim 1, wherein the member is adapted for subsonic flight.

6. The member of claim 1, further comprising a coupling to couple the first body portion to a rotor hub.

7. The member of claim 1, wherein each of the airfoil members has a first end and a second end, the first ends of the airfoil members being coupled to the first body portion and the second ends of the airfoil members defining an open end of the second body portion.

8. An aerodynamic member comprising:
    a first body portion having a first overall thickness;
    a second body portion coupled to the first body portion, having a second overall thickness, and including a plurality of airfoil members within the second overall thickness, the airfoil members being in a fixed relationship with each;
    a third body portion including an airfoil and coupled to the second body portion on a side of the second body portion that is opposite the first body portion; and
    wherein the second body portion is cambered.

* * * * *